United States Patent Office 2,742,982
Patented Apr. 24, 1956

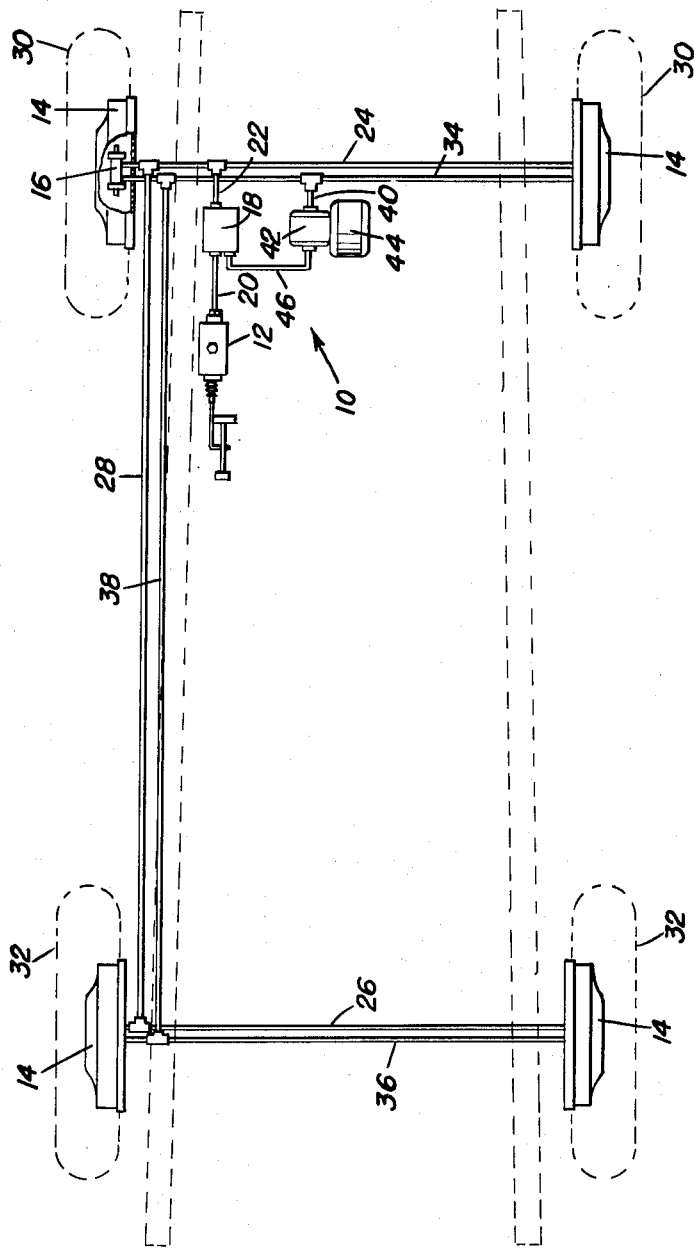
August F. W. Helmbold
INVENTOR.

2,742,982

HYDRAULIC BRAKE SYSTEM

August F. W. Helmbold, Fort Thomas, Ky.

Application September 30, 1952, Serial No. 312,321

1 Claim. (Cl. 188—152)

This invention relates to new and useful improvements and structural refinements in hydraulic brake systems of automobiles and similar vehicles, and the principal object of the invention is to prevent structural failure in the system, such as for example, leaking cylinders or broken lines, resulting from excessive fluid pressure in the system under hot weather conditions.

The above object is achieved by employing in the hydraulic system dual fluid lines and utilizing a pump for circulating the fluid through the lines so that the fluid, by virtue of such circulation, remains comparatively cool.

With the above more important objects and features in view, and such other objects and features as may become apparent as this specification proceeds, the invention consists essentially of the arrangement and construction of parts as illustrated in the accompanying drawings, in which:

The figure of the drawing is a diagrammatic view of a hydraulic brake system constructed in accordance with the invention.

Referring now to the accompanying drawing in detail, the hydraulic system is designated generally by the reference character 10 and includes in its construction a conventional master cylinder 12 and a plurality of wheel cylinders located in the brake drums 14, one of such wheel cylinders being illustrated at 16.

The invention also contemplates the provision of a fluid reservoir 18 to which the master cylinder 12 is operatively connected by a short tube 20, and fluid pressure from the reservoir is transmitted to the various wheel cylinders 16 by the transmission lines 22, 24, 26 and 28. The line 22 is connected to the line 24 extending between the brake cylinders of the two front wheels 30, while the line 28 extends between the line 24 and the line 26 extending between the two rear wheels 32.

In addition, a fluid return line 34 extends between the cylinders of the two front wheels while a return line 36 extends between the wheel cylinders of the back wheels 32, the lines 34, 36 being connected together by a return line 38.

The line 34 is connected by a tube 40 to the inlet of a fluid pump 42, the latter being driven by a suitable motor 44 and having an outlet connected by a tube 46 to the reservoir 18.

When the invention is placed in use and the pump 42 is in operation, the brake fluid in the various lines will be circulated, that is, the pump will propel the fluid through the lines 24, 28 and 26 to the various wheel cylinders and back through the return lines 34, 38 and 36 to the reservoir 18 so that the fluid, under circulation, will remain substantially cool regardless of the outside temperature.

The cooling action is obtained primarily because the continuously moving fluid through the cartridge or supply line system provides a much greater heating exchange area between the fluid and conduits than conventional braking systems. Also, the bulk of the fluid is not permitted to remain stagnant in the master cylinder and wheel cylinders, but is constantly moved through the supply lines wherein the heat exchange area with the atmosphere is greatest.

Of course, the brake system may be placed under pressure by the master cylinder 12 in the conventional manner, notwithstanding the circulatory motion of the fluid therein. It is understood that the rated capacity of fluid pressure output of the pump 42 will be sufficient to circulate the fluid throughout the system, however, this fluid pressure output will be sufficiently low or less than the pressure required to initially actuate the wheel cylinders in the brake system and apply the brakes of the vehicle.

It is believed that the advantages and use of the invention will be readily understood from the foregoing disclosure and therefore, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a hydraulic brake system, the combination of a fluid reservoir, a master cylinder, a plurality of wheel cylinders, fluid transmission lines extending from said reservoir to said wheel cylinders, fluid return lines interconnecting all of said wheel cylinders, a pump, a fluid line interconnecting said pump with said reservoir and one of said return lines whereby upon operation of the pump fluid is circulated from the reservoir through all of the fluid transmission and return lines prior to returning to the reservoir for recirculation, said master cylinder being independently connected to said fluid reservoir for selectively applying pressure on the reservoir and actuating the wheel cylinders of the brake system.

References Cited in the file of this patent

UNITED STATES PATENTS

| 1,723,032 | Harrington | Aug. 6, 1929 |
| 2,150,617 | Weihe | Mar. 14, 1939 |
| 2,385,168 | Stelzer | Sept. 18, 1945 |
| 2,406,304 | Levy | Aug. 20, 1946 |
| 2,484,888 | Hollerith | Oct. 18, 1949 |

FOREIGN PATENTS

| 783,756 | France | Apr. 15, 1935 |